United States Patent
Chen et al.

(10) Patent No.: US 11,808,560 B2
(45) Date of Patent: Nov. 7, 2023

(54) DIMENSION MEASUREMENT APPARATUS

(71) Applicant: Industrial Technology Research Institute, Hsinchu (TW)

(72) Inventors: Yi-Cheng Chen, New Taipei (TW); Yi-Chia Hsu, Tainan (TW); Chia-Ching Lin, Tainan (TW); Chih-Chieh Chao, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 250 days.

(21) Appl. No.: 17/369,196

(22) Filed: Jul. 7, 2021

(65) Prior Publication Data
US 2022/0187056 A1 Jun. 16, 2022

(30) Foreign Application Priority Data
Dec. 14, 2020 (TW) .................... 109144106

(51) Int. Cl.
*G01B 11/02* (2006.01)
*G01B 5/00* (2006.01)
*G01B 5/02* (2006.01)

(52) U.S. Cl.
CPC ............ *G01B 11/02* (2013.01); *G01B 5/0004* (2013.01); *G01B 5/02* (2013.01)

(58) Field of Classification Search
CPC ........ G01B 11/02; G01B 5/0004; G01B 5/02; G01B 11/022; G01B 5/0002
See application file for complete search history.

(56) References Cited

U.S. PATENT DOCUMENTS 4,676,649 A * 6/1987 Phillips .................. B23Q 1/385
250/548
4,800,652 A * 1/1989 Ballas .................... G01B 5/207
33/504

(Continued)

FOREIGN PATENT DOCUMENTS

| CN | 107219038 A | 9/2017 |
| CN | 107764182 A | 3/2018 |

(Continued)

OTHER PUBLICATIONS

Fan, Kuang-Chao "Strategic planning of developingautomatic optical inspection (AOI)technologies in Taiwan", Jan. 2005, pp. 394-397, Journal of Physics Conference Series.

(Continued)

*Primary Examiner* — Yaritza Guadalupe-McCall
(74) *Attorney, Agent, or Firm* — WPAT, P.C

(57) ABSTRACT

A measuring equipment, applied to carry a workpiece to be measured, includes a main base and a positioning device. The main base includes a measuring center axis. The positioning device includes at least two positioning elements. Each of the at least two positioning elements is disposed movably on the main base, and each of the at least two positioning elements is moved with respect to the measuring center axis. An identical distance is there from each of the at least two positioning elements to the measuring center axis. Each of the at least two positioning elements is used for the workpiece to contact and to be positioned to the measuring center axis.

18 Claims, 14 Drawing Sheets

(56) References Cited

U.S. PATENT DOCUMENTS

| | | | | |
|---|---|---|---|---|
| 4,974,333 | A * | 12/1990 | Ginzburg | G01B 7/048 33/711 |
| 6,232,736 | B1 * | 5/2001 | Bullen | B23Q 37/00 318/632 |
| 6,463,667 | B1 * | 10/2002 | Ushio | G01B 21/045 73/1.79 |
| 6,811,131 | B2 * | 11/2004 | Kuo | B25B 5/003 33/645 |
| 7,152,331 | B2 * | 12/2006 | Nakamura | G03F 7/70058 33/573 |
| 7,191,540 | B1 * | 3/2007 | Brewer | G01B 5/20 33/503 |
| 7,271,879 | B2 * | 9/2007 | Lim | B23Q 17/2495 355/75 |
| 7,350,308 | B2 * | 4/2008 | Mysore | G01B 5/20 33/503 |
| 7,752,003 | B2 * | 7/2010 | MacManus | G01B 21/042 33/503 |
| 7,788,819 | B2 * | 9/2010 | Hon | G05B 19/401 33/561 |
| 8,537,372 | B2 * | 9/2013 | Pettersson | G01B 21/045 33/503 |
| 8,607,466 | B2 * | 12/2013 | Pettersson | G01B 21/045 33/503 |
| 8,707,573 | B2 * | 4/2014 | DeRoche | G01B 5/0002 33/813 |
| 8,978,261 | B2 * | 3/2015 | McFarland | G05B 19/401 73/104 |
| 8,992,671 | B2 | 3/2015 | Matsuno | |
| 9,586,394 | B2 | 3/2017 | Xue et al. | |
| 10,029,314 | B1 | 7/2018 | Wu et al. | |
| 10,335,859 | B2 | 7/2019 | Liu et al. | |
| 10,562,105 | B1 | 2/2020 | Len | |
| 11,525,660 | B2 * | 12/2022 | Sekimoto | G01B 5/0004 |
| 2009/0031572 | A1 * | 2/2009 | Boesser | G01B 9/02052 33/503 |
| 2014/0026430 | A1 * | 1/2014 | Xu | G01B 3/34 33/549 |
| 2015/0233693 | A1 * | 8/2015 | Senn | B23Q 17/20 451/5 |
| 2022/0187056 | A1 * | 6/2022 | Chen | G01B 5/0004 |
| 2023/0168073 | A1 * | 6/2023 | Takahashi | G01B 3/22 33/783 |

FOREIGN PATENT DOCUMENTS

| | | |
|---|---|---|
| CN | 108474719 A | 8/2018 |
| DE | 102009021122 A1 | 11/2010 |
| TW | I261663 B | 9/2006 |
| TW | I599770 | 9/2017 |
| TW | I645157 B | 12/2018 |
| TW | I697263 | 6/2020 |
| TW | I698630 | 7/2020 |
| TW | I702382 | 8/2020 |

OTHER PUBLICATIONS

Huang et al. "From Image Processing To Computer Vision", Jan. 2003, Department of Electrical Engineering, National Cheng Kung University, Taiwan.

Chiu, Yi-Jia "Structural Design and Improvement of an Automatic Optical Inspection Machine" Jul. 2011, Department of Mechanical Engineering College of Engineering National Taiwan University Master Thesis, Taiwan.

Taiwan patent office "Office Action" dated May 4, 2021, Taiwan.

* cited by examiner

DIMENSION MEASUREMENT APPARATUS

CROSS REFERENCE TO RELATED APPLICATION

This application claims the benefits of Taiwan application Serial No. 109144106, filed on Dec. 14, 2020, the disclosures of which are incorporated by references herein in its entirety.

TECHNICAL FIELD

The present disclosure relates in general to a dimension measurement apparatus applied for machining process.

BACKGROUND

Machining process that utilizes processing machinery to change the shape or performance of the workpiece, and usually integrates a plurality of procedures to form a production line. As soon as a workpiece is fed, a first process is applied to form a characteristic. After this characteristic is formed, another process is applied to form another characteristic. As such, every process is performed upon the workpiece in order. For example, a process is firstly applied to machine a central hole and part of a wheel wall of a workpiece, and then a further process will be applied to perform processing upon the upper surface of the workpiece. Between these two processes, a measurement device would be introduced to measure dimensions at some key characteristics of the workpiece. Practically, before the second process is performed, an investigation of the workpiece upon dimensions, i.e., size and roundness of the central hole and a level height of the upper surface, should be performed.

However, among current measurement designs, a mechanical arm is provided to carry and then places the workpiece onto a measuring platform. In this case, a problem of shaking of the suspended workpiece often occurs, and it would lead to position inaccuracy and measuring errors.

In addition, some contaminants such as cutting fluid and chips are usually left on the surface of the workpiece after a machining process. Though the machining process is generally accompanied by steps of air blowing and cleaning, yet it cannot ensure that those contaminants on the workpiece surface could be removed completely. If the workpiece is directly placed on the measuring platform, these contaminants, such as surface chips or fluids, would make the measuring platform dirty and interfere the measurement. Thus, to improve the measurement process is one of crucial issues urgent to the skill in the art.

SUMMARY

In one embodiment of this disclosure, a measuring equipment, applied to carry a workpiece to be measured, includes a main base and a positioning device. The main base includes a measuring center axis. The positioning device includes at least two positioning elements. Each of the at least two positioning elements is disposed movably on the main base, and each of the at least two positioning elements is moved with respect to the measuring center axis. An identical distance is there from each of the at least two positioning elements to the measuring center axis. Each of the at least two positioning elements is used for the workpiece to contact and to be positioned to the measuring center axis.

As stated, in the measuring equipment provided by this disclosure, based on the dimension (particularly, the radius) of the workpiece, each of the positioning elements can be adjusted to have all the distances from individual positioning elements to the measuring center axis to be equal to the radius of the inscribed circle of the workpiece. Thereupon, as the workpiece is placed against each of the positioning elements, the corresponding measuring point at the workpiece would be aligned with the measuring center axis, and so the workpiece can resume its original positioning. Further, such a measuring equipment in accordance with the present disclosure can be widely applied, with an enhanced measuring precision.

DETAILED DESCRIPTION

Figure 1:
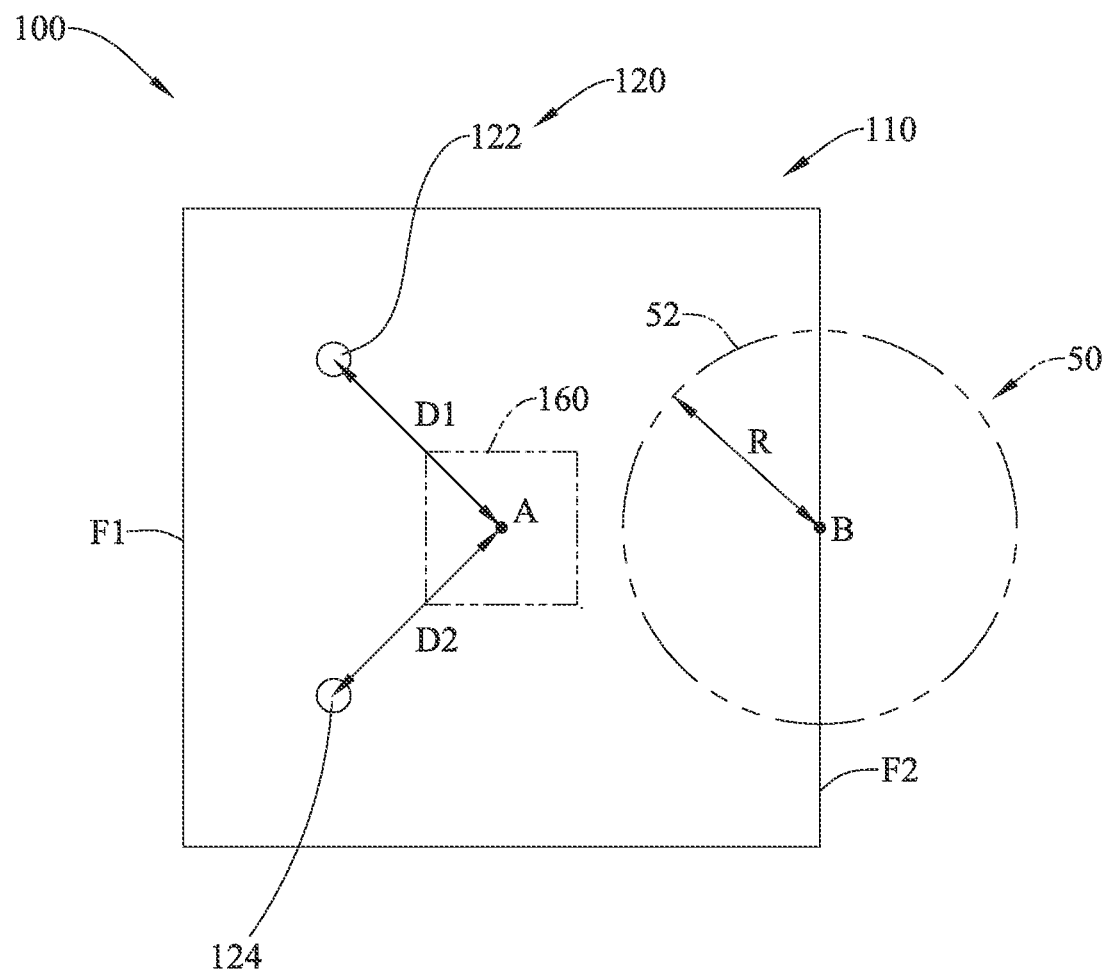
FIG. 1 is a schematic top view of an embodiment of the dimension measurement apparatus in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic top view of an embodiment of the measuring equipment in accordance with this disclosure. Referring to FIG. 1, in this embodiment, the measuring equipment 100 can be applied to carry a workpiece 50 to be tested, and used for measuring geometric dimensions of key characteristics, such as roundness and sizes of a central hole of the workpiece 50 and a level height of an upper surface of the workpiece 50. It shall be explained, but not limited to, that the workpiece 50 can be a cylinder such as a wheel frame. In one embodiment not shown herein, the workpiece can be a polygonal object.

In this embodiment, the measuring equipment 100 includes a main base 110 and a positioning device 120. The main base 110 includes a measuring center axis A. The positioning device 120 includes a first positioning element 122 and a second positioning element 124, and both of the first positioning element 122 and the second positioning element 124 are disposed at the main base 110 and movably positioned. The first positioning element 122 and the second positioning element 124 are located oppositely to each other with respect to the measuring center axis A, and move therealong, such that a first distance D1 between the first positioning element 122 and the measuring center axis A can be equal to a second distance D2 between the second positioning element 124 and the measuring center axis A. Thus, it can be realized that, through adjusting positioning of the first positioning element 122 and the second positioning element 124 at the main base 110, the first distance D1 and the second distance D2 can be modulated to fit the size of the workpiece 50.

Under such an arrangement, in this embodiment, the first distance D1 and the second distance D2 from the first positioning element 122 and the second positioning element 124, respectively, to the measuring center axis A can be further set according to the dimensions of the workpiece 50. For example, provided that the workpiece 50 has a cylindrical appearance with a radius R, then the first distance D1 and the second distance D2 can be set to an R, equal to the radius R of the workpiece 50. In addition, a measuring point B can be set to a center of the workpiece 50, and a distance from the measuring point B to a peripheral surface 52 of the workpiece 50 is set to the radius R. When the workpiece is a polygon (not shown herein), the radius of the workpiece can be set to a radius of an inscribed circle of the polygon, the measuring point of the workpiece is set at the center of the inscribed circle of the workpiece, and the first distance D1 and the second distance D2 are set to be equal to the radius of the inscribed circle of the workpiece.

Then, by utilizing a mechanical arm (not shown herein), a conveying belt (not shown herein) or any human or other means, the workpiece 50 can be located onto the main base 110, and the first positioning element 122 and the second positioning element 124 are applied to contact against the workpiece 50, so that the workpiece 50 can be positioned to the measuring center axis A. In this embodiment, the appearance of the workpiece 50 can be circular, and thus, when a peripheral surface 52 of the workpiece 50 is contacted by the first positioning element 122 and the second positioning element 124, the measuring point B of the workpiece 50 would lie right on the measuring center axis A. This measuring point B is herein the center of the circle. On the other hand, if the workpiece 50 has an appearance of polygon, then the first distance D1 between the first positioning element 122 and the measuring center axis A and the second distance D2 between the measuring center axis A and the second positioning element 124 are both set to be the radius of the inscribed of the polygon. Any two outer walls of the side walls of the polygonal workpiece 50 is individually contacted by the first positioning element 122 and the second positioning element 124. Thereby, the center of the workpiece 50 can still coincide with the measuring center axis A. As such, no matter what the appearance or size of the workpiece 50 is, or no matter how many times of the workpiece 50 are located or relocated onto the main base 110, as the peripheral surface 52 of the workpiece 50 is contacted against the first positioning element 122 or the second positioning element 124, the measuring point B of the workpiece 50 would coincide the measuring center axis A. Thus, no matter what the time is to place the workpiece 50, the aforesaid problem in re-positioning the workpiece 50 can be resolved.

It shall be explained, but not limited to, that this disclosure is not only to disclose the technique how the positions of the first positioning element 122 and the second positioning element 124 can be adjusted on the main base 110. For example, in this embodiment, the measuring equipment 100 can connect a processor (not shown in the figure) for receiving dimensions (such as the radius) of the workpiece 50, and/or coordinate information of the first positioning element 122, the second positioning element 124 and the measuring center axis A, for further controlling a motor (not shown herein) to adjust the positions of the first positioning element 122 and the second positioning element 124. However, the adjustment of the first positioning element 122 and the second positioning element 124 can be performed manually, and further applies a fixing and positioning means of magnetic force or hole-and-latch pairs. Further, this disclosure is not limited to the processor and the motor.

In this embodiment, the measuring equipment 100 further includes a measuring module 160 assembled together with the main base 110. After the workpiece 50 is positioned by the aforesaid process, the measuring module 160 is used for measuring the workpiece 50. In this embodiment, the measuring center axis A is coaxial with the measuring module 160. In addition, the measuring module 160 can be disposed above or under the main base 110. It shall be explained that the measuring center axis A can be an image center of the measuring module 160 (i.e., the measuring center axis A is coincided with the measuring module 160), a geometric center or any relevant position of the main base 110, or an element or a target point (such as the center of the through hole 216 in FIG. 2) disposed on the main base 110. In one example of cutting, the cutting point of the tooling can be set to be the measuring center axis A. In another example of laser application, the optical axis of the laser can be set to be the measuring center axis A.

Figure 2:
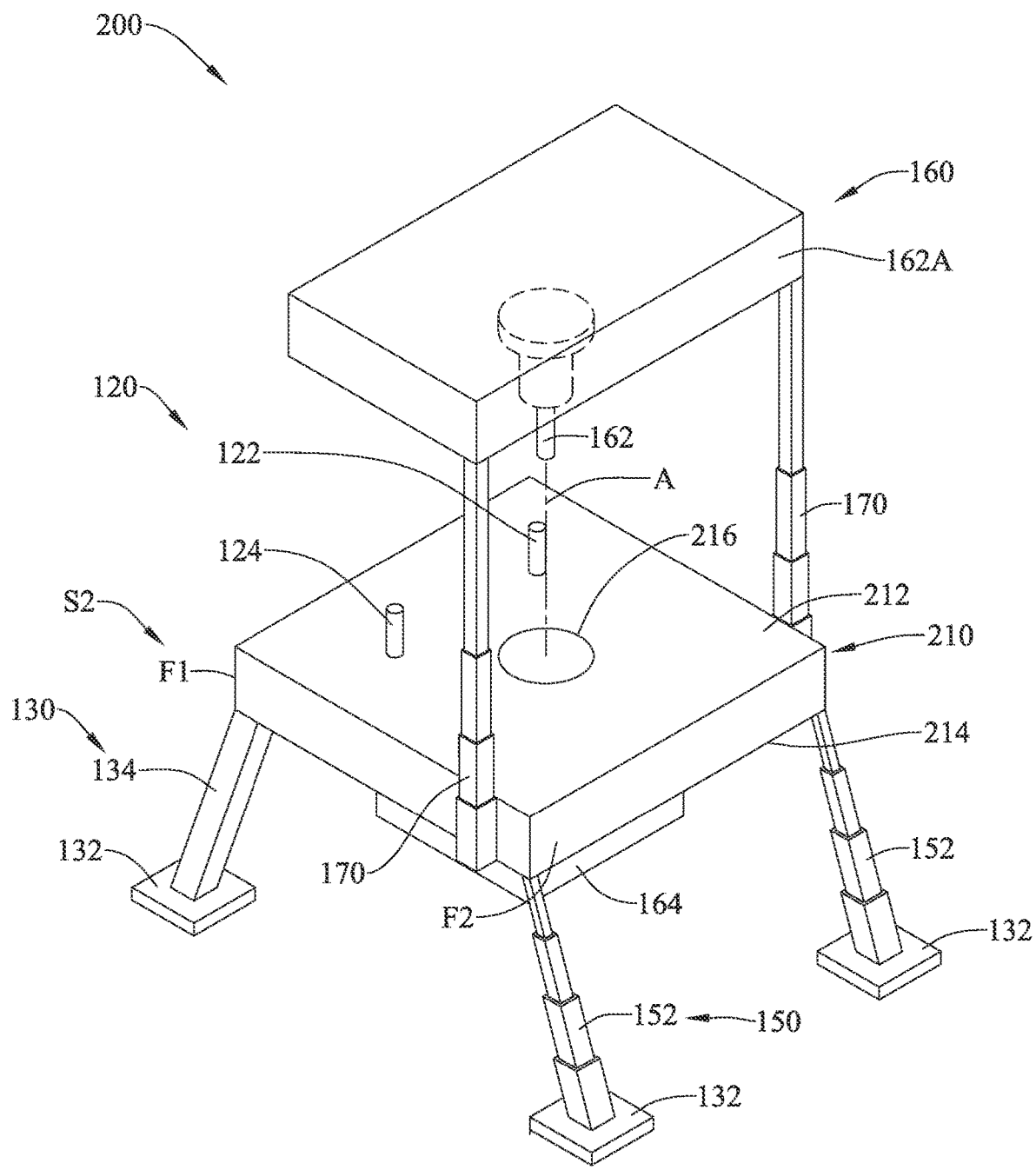
FIG. 2 is a schematic perspective view of another embodiment of the dimension measurement apparatus in accordance with this disclosure.
Figure 3:
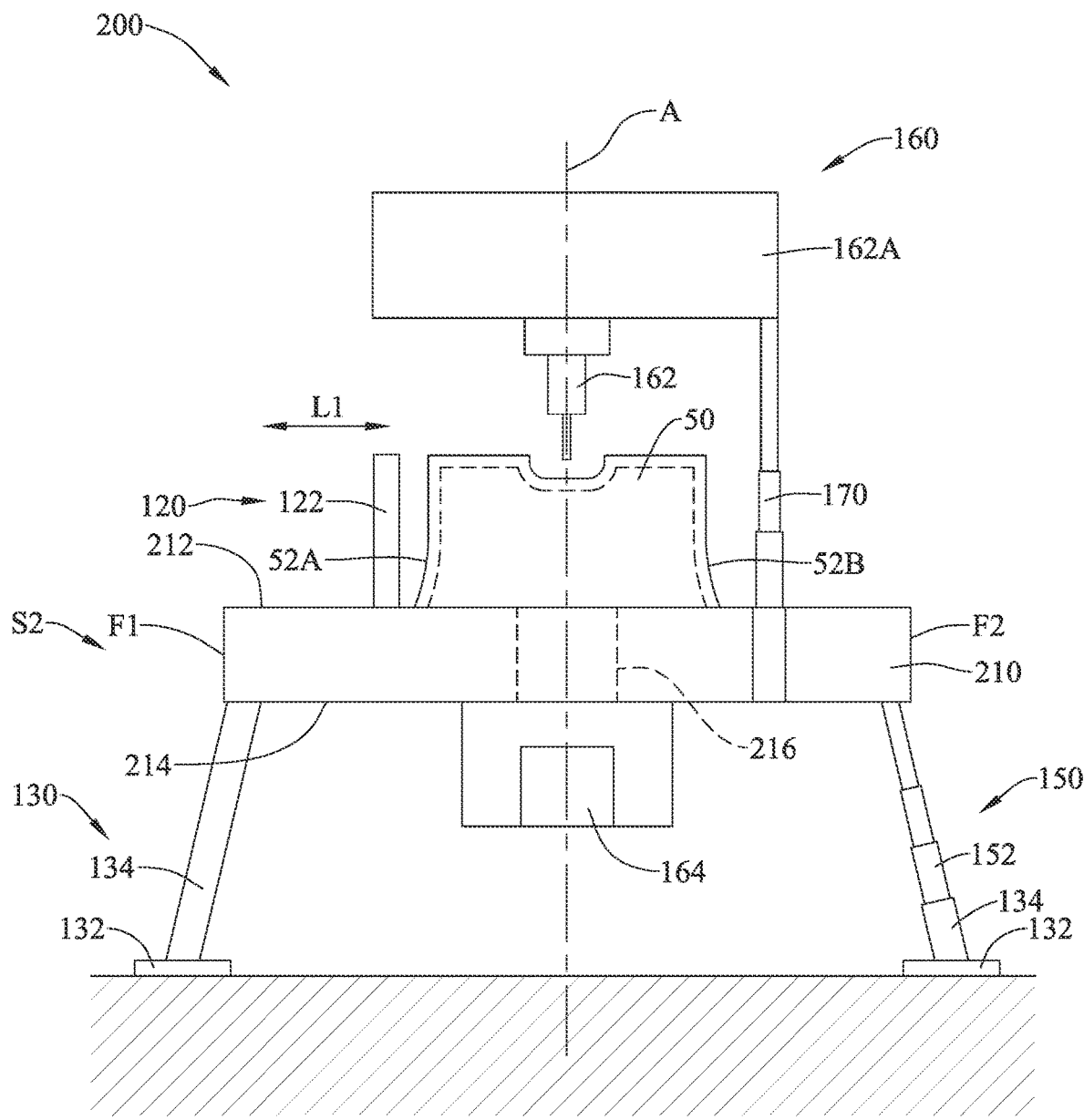
FIG. 3 is a schematic side view of FIG. 2.

FIG. 2 is a schematic perspective view of another embodiment of the measuring equipment in accordance with this disclosure, and FIG. 3 is a schematic side view of the measuring equipment in FIG. 2. Referring to FIG. 2 and FIG. 3, in this embodiment, the main base 210 of the measuring equipment 200 includes oppositely a top surface 212 and a bottom surface 214. The measuring center axis A penetrates through both the top surface 212 and the bottom surface 214. The top surface 212 of the main base 210 is provided to place thereon the workpiece 50. The first positioning element 122 and the second positioning element 124 are individually protrusive over the top surface 212 of the main base 210 from different positions thereof. It shall be explained that, in this embodiment, both the first positioning element 122 and the second positioning element 124 are round cylinders. In another embodiment, the first positioning element 122 and the second positioning element 124 can be other shapes.

In adjusting the positions of the first positioning element 122 and the second positioning element 124 on the main base 210 according to the dimension of the workpiece 50, the first positioning element 122 and the second positioning element 124 are individually to move in the first direction L1 so as to have either of the first positioning element 122 and the second positioning element 124 to be separated from the measuring center axis A by a distance equal to the radius of the inscribed circle of the workpiece 50. Then, the workpiece 50 is moved to position on the top surface 212 of the main base 210. If the front peripheral surface 52A of the workpiece 50 has not yet contacted the first positioning element 122 and/or the second positioning element 124, then the workpiece 50 can be pushed (such as the push from the rear peripheral surface 52B of the workpiece 50) or pulled, so as to move the workpiece 50 toward the first positioning element 122 and the second positioning element 124 till to contact both of the first positioning element 122 and the second positioning element 124.

In addition, the measuring module 160 can include a first sensing element 162 and a second sensing element 164 for performing different scales of measurement upon the workpiece 50. By having the embodiment shown in FIG. 2 and FIG. 3 as an example, the first sensing element 162 and the second sensing element 164 are individually disposed to opposite sides of the main base 210, and the workpiece 50 is placed on the main base 210. The first sensing element 162 and the second sensing element 164 of the measuring module 160 are then to measure the workpiece 50, respectively. In this embodiment, the main base 210 further includes a through hole 216 penetrating through the main base 210 by extending from the top surface 212 to the bottom surface 214, and the measuring center axis A is set to be coaxial with a center of the through hole 216. Referring to FIG. 3, the upper side of the through hole 216 is right facing the first sensing element 162, while the lower side thereof is right facing the second sensing element 164. After the workpiece 50 has been placed on the main base 210, the first sensing element 162 can measure the workpiece 50, and also the second sensing element 164 can measure the workpiece 50 through the through hole 216.

In some other embodiments, the measuring module 160 can simply include the first sensing element 162 disposed on the main base 210. In this circumstance, the main base 210 can exclude the through hole 216 (as the embodiment shown in FIG. 1). Namely, the main base 110 of FIG. 1 is used to replace the main base 210 of FIG. 2 or FIG. 3. In this embodiment, the positioning device 120 can be also applied to align the measuring point B of the workpiece 50 with the measuring center axis A, such that the workpiece 50 can be precisely positioned for enhancing the measuring accuracy of the first sensing element.

In this disclosure, the type of the measuring module 160 and the ways for assembling the measuring module 160 and the main base 210 are not specifically defined. For example, the first sensing element 162 can be a laser displacement detector, and the second sensing element 164 can be an optical camera. The measuring equipment 200 further includes a measuring base 162A and a connecting element 170. The connecting element 170 is used to connect the main base 210 and the measuring base 162A. The measuring base 162A is further connected with the first sensing element 162, such that the measuring module 160 can be fixed and movable with the main base 210. The sensing elements of the measuring module 160 can be adjusted to different types according to the practical manufacturing processes. Since the measuring center axis A, the first sensing element 162 and the second sensing element 164 are co-axial, thus, as long as the workpiece 50 is positioned to the measuring center axis A, the measuring accuracy upon the workpiece 50 can be substantially enhanced.

In this embodiment, the second sensing element 164 located under the main base 110 is an optical lens for capturing an image of the workpiece 50 for further analysis through the through hole 216. On the other hand, the first sensing element 162 located above the main base 210 is a contact-type geometric probe for detecting the surface of the workpiece 50 so as to provide coordinate information for further calculation. For example, the workpiece 50 can be a semi-finished wheel frame having a central hole requiring an optical investigation by the optical lens of the second sensing element 164 so as to realize whether or not the geometric dimensions of the workpiece 50 (such as the outer radius and the roundness can meet the tolerance requirements. Also, through the probe of the first sensing element 162 to realize level height information around the central hole. Thereupon, the geometric dimensions and the level height information of the workpiece 50 can be set as initial coordinates for the following manufacturing process. Nevertheless, the measuring device for this disclosure is not specifically limited, and actually any measuring device that can serve the similar purpose can be one of the measuring elements qualified for this disclosure.

Figure 4:
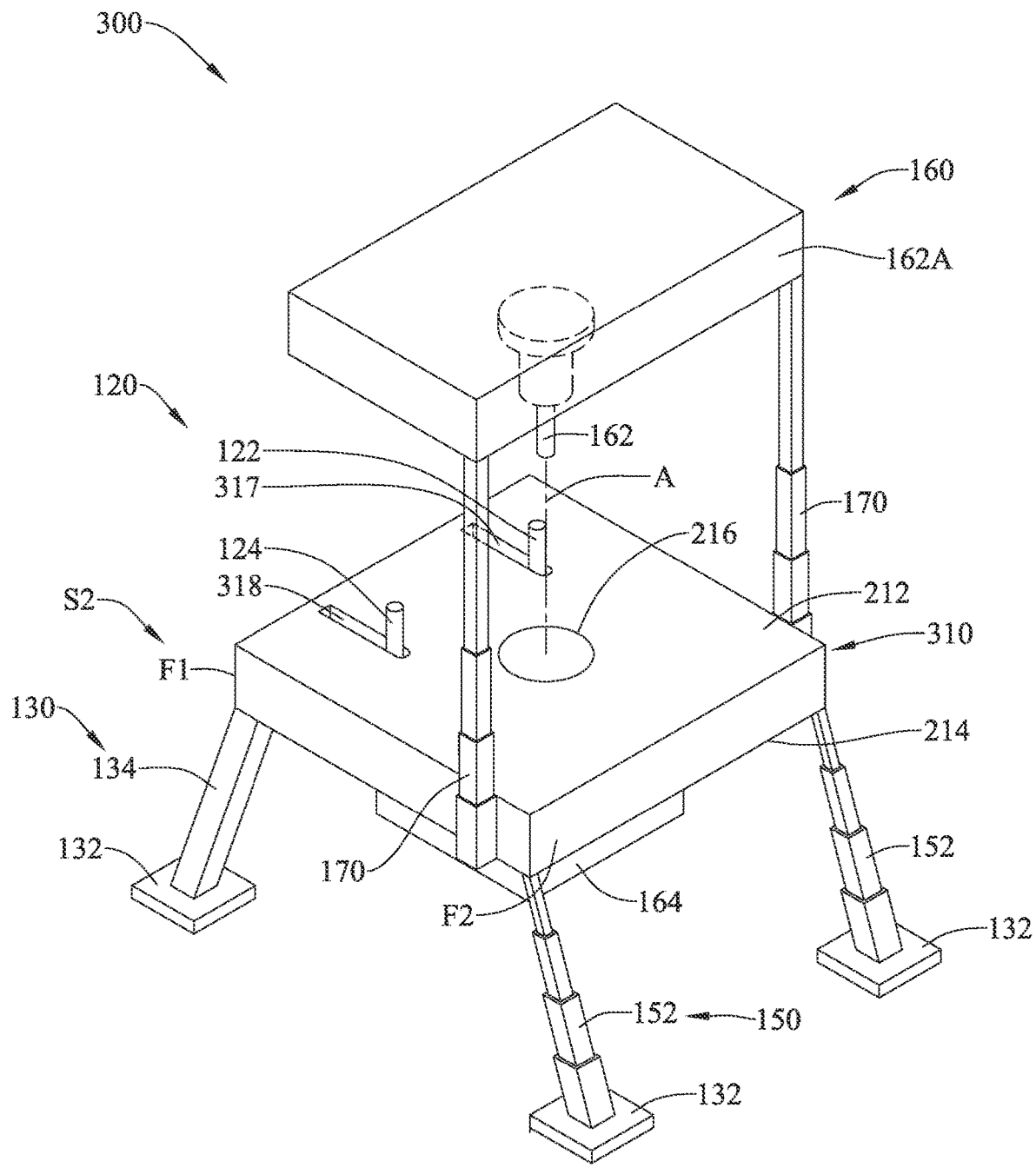
FIG. 4 is a schematic perspective view of a further embodiment of the measuring equipment in accordance with this disclosure.
Figure 5A:
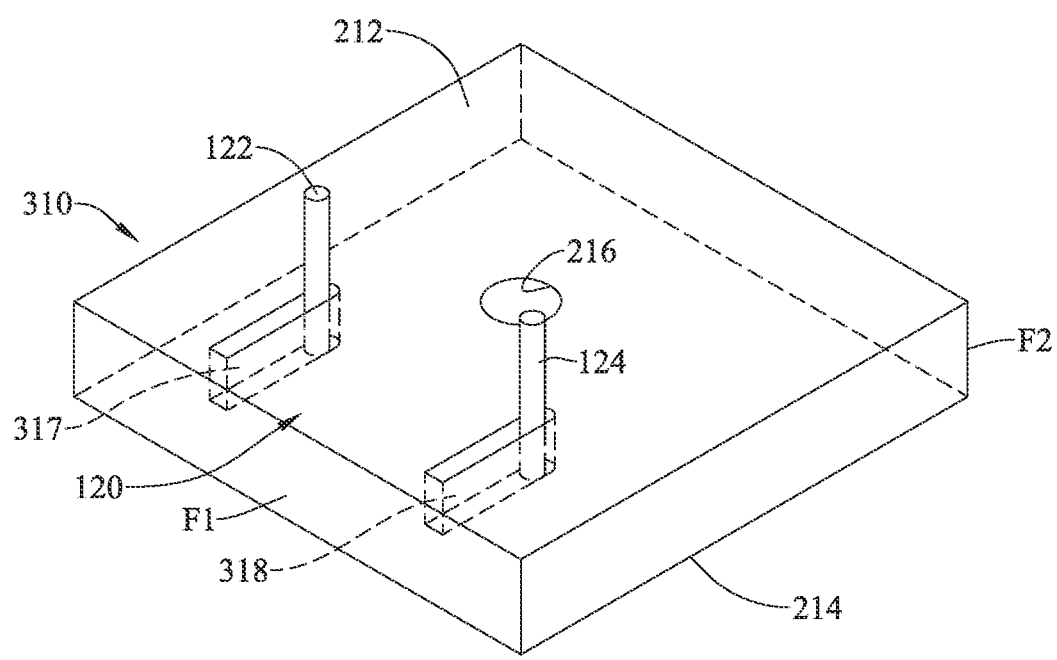
FIG. 5A demonstrates schematically an exemplary example of the main base and the positioning device of FIG. 4.
Figure 5B:
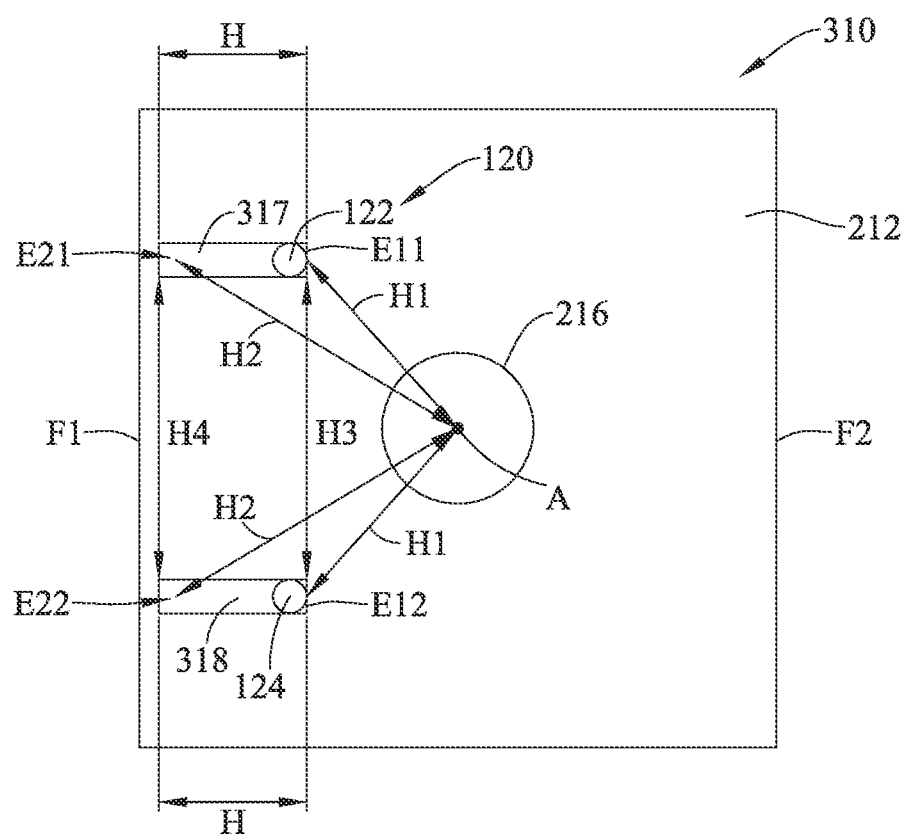
FIG. 5B is a schematic top view of the main base of FIG. 5A.

FIG. 4 is a schematic perspective view of a further embodiment of the measuring equipment in accordance with this disclosure, FIG. 5A demonstrates schematically an exemplary example of the main base and the positioning device of FIG. 4, and FIG. 5B is a schematic top view of the main base of FIG. 5A. In this embodiment of FIG. 4, the measuring equipment 300 is similar to the measuring equipment 200 of FIG. 2 and FIG. 3, but differences between the main base 310 of this embodiment and the main base 210 of FIG. 2 and FIG. 3 include at least that, in this embodiment, the main base 310 further includes a first positioning slot 317 and a second positioning slot 318, formed at the main base 310 at different locations thereof. The first positioning slot 317 includes two opposite ends, a near end E11 and a far end E21; and, the second positioning slot 318 also includes two opposite ends, another near end E12 and another far end E22. A distance from the near end E11 of the first positioning slot 317 to the measuring center axis A is equal to another distance from the near end E12 of the second positioning slot 318 to the measuring center axis A, and this distance is defined as H1. In addition, a distance from the far end E21 of the first positioning slot 317 to the measuring center axis A is equal to another distance from the far end E22 of the second positioning slot 318 to the measuring center axis A, and this distance is defined as H2. In this embodiment, the distance H1 is less than the distance H2.

In this embodiment, the first positioning element 122 is disposed in the first positioning slot 317, and able to slide along the first positioning slot 317 for determining a position suitable to the workpiece. The second positioning element 124 is disposed in the second positioning slot 318, and able to slide along the second positioning slot 318 for determining a position suitable to the workpiece. When the first positioning element 122 and the second positioning element 124 reach the corresponding far ends E21, E22 of the first positioning slot 317 and the second positioning slot 318, respectively, the distance from either of the first positioning element 122 and the second positioning element 124 to the measuring center axis A is close to the distance H2. When the first positioning element 122 and the second positioning element 124 reach the corresponding near ends E11, E12 of the first positioning slot 317 and the second positioning slot 318, respectively, the distance from either of the first positioning element 122 and the second positioning element 124 to the measuring center axis A is close to the distance H1, which is less than the distance H2. Thus, this embodiment can be used to measure a workpiece with a smaller radius of the inscribed circle. Namely, in this embodiment, the first positioning element 122 and the second positioning element 124 can be adjusted to anchor at specific sections of the first positioning slot 317 and the second positioning slot 318 to support the measuring upon the workpiece having the radius of the inscribed circle radius to be greater than or equal to the distance H1, but smaller than the distance H2. In addition, as shown in FIG. 5B, the first positioning slot 317 and the second positioning slot 318 have the same length H, and this length H can be adjusted according to the practical dimensions of the workpiece.

The first positioning element 122 and the second positioning element 124 can be synchronously driven by an actuator (such as a motor, not shown in the figure) moving inside the first positioning slot 317 or the second positioning slot 318. Thus, while the first positioning element 122 and the second positioning element 124 moves, the distance from either of these two positioning elements 122, 124 to the measuring center axis A can be equal to the radius of the inscribed circle of the workpiece.

Figure 6:
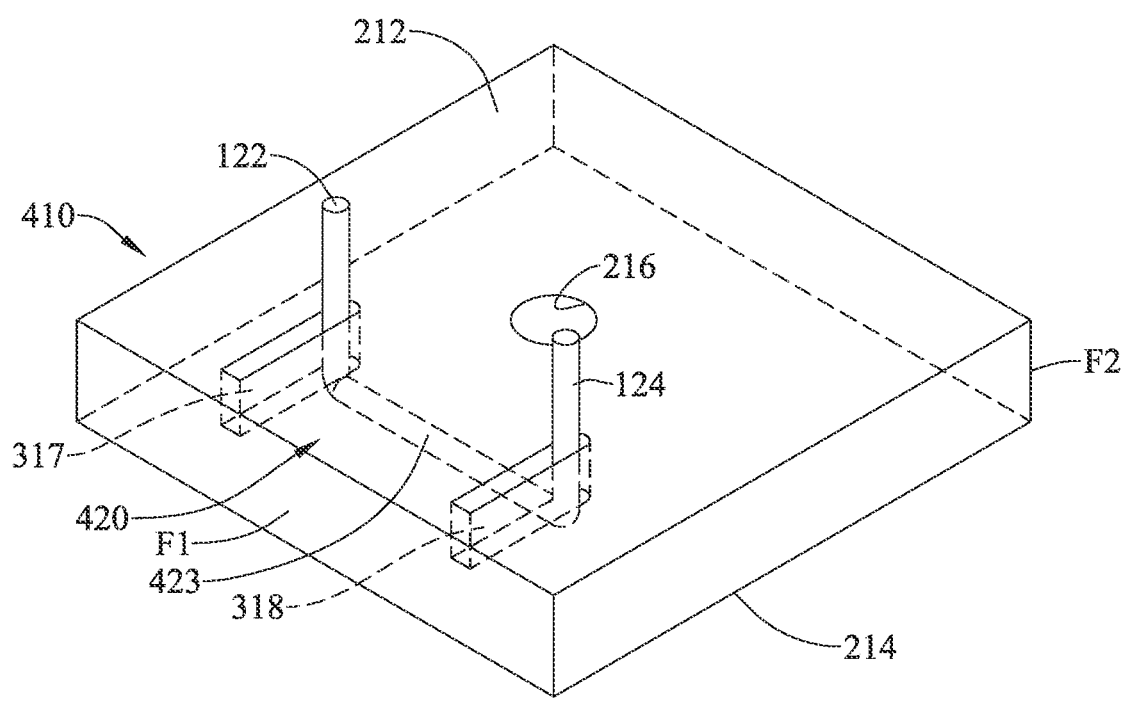
FIG. 6 demonstrates schematically another exemplary example of the main base and the positioning device of FIG. 4.

In another embodiment shown in FIG. 6, the positioning device 420 of the main base 410 can further includes a connecting bar 423 connecting the first positioning element 122 to the second positioning element 124. With this connecting bar 423, the first positioning element 122 and the second positioning element 124 can displace synchronously. In some other embodiments, the first positioning element 122 and the second positioning element 124 can move individually, but meet the criterion that the distance from either of the first positioning element 122 and the second positioning element 124 to the measuring center axis A should be equal to the radius of the inscribed circle of the workpiece, finally.

Figure 7A:
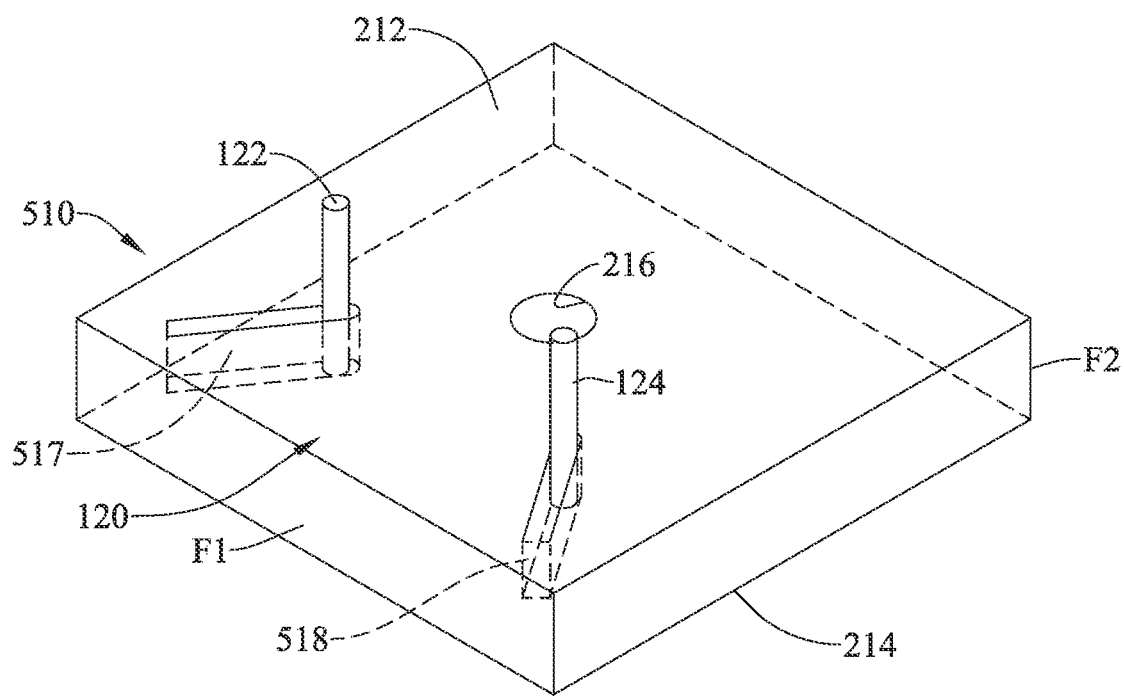
FIG. 7A demonstrates schematically a further exemplary example of the main base and the positioning device of FIG. 4.
Figure 7B:
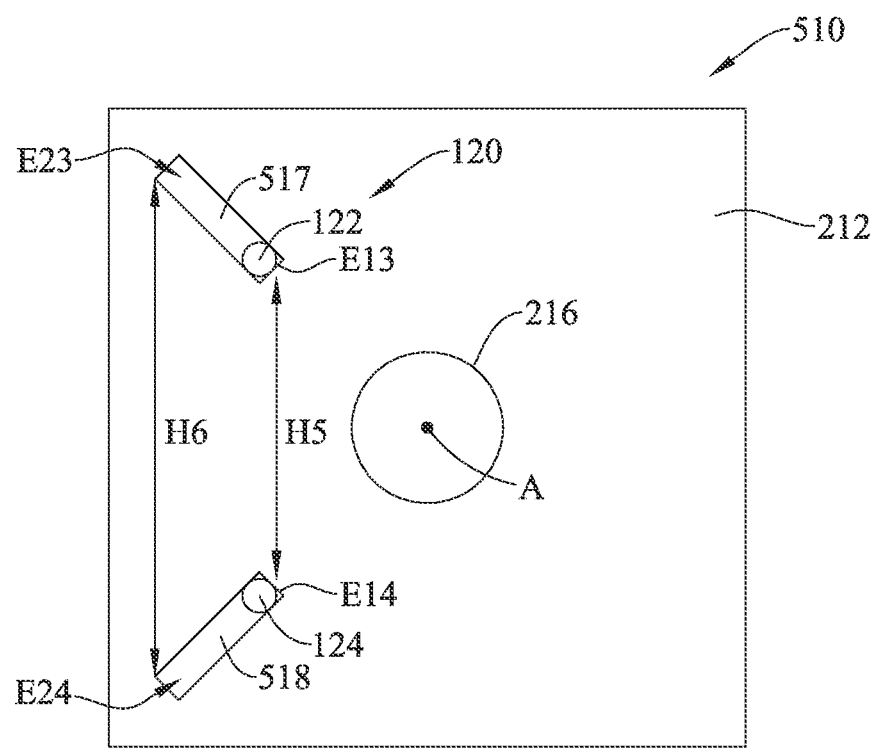
FIG. 7B is a schematic top view of FIG. 7A.

In addition, as shown in FIG. 4, FIG. 5A, FIG. 5B or FIG. 6, the first positioning slot 317 and the second positioning slot 318 are extended in a parallel manner, from the near end E11 to the far end E21 for the first positioning slot 317, and from the near end E12 to the far end E22 for the second positioning slot 318. Namely, in the first positioning slot 317 and the second positioning slot 318, a distance H3 between the two near ends E11, E12 is, but not limited to, equal to another distance H4 between the two far ends E21, E22. However, the first positioning slot 317 and the second positioning slot 318 can also extend in a non-parallel manner. For example, as shown in FIG. 7A and FIG. 7B, the first positioning slot 517 of the main base 510 and the second positioning slot 518 thereof are extended toward the through hole 216 in a non-parallel manner. In this first positioning slot 317 and this second positioning slot 318, a distance H5 between the two near ends E13, E14 is less than another distance H6 between the two far ends E23, E24. Similar to the aforesaid FIG. 5B, in the first positioning slot 517 and the second positioning slot 518, a distance from the near end E13 to the measuring center axis A is equal to another distance from another near end E14 to the measuring center axis A, and a distance from the far end E23 to the measuring center axis A is equal to another distance from another far end E24 to the measuring center axis A. The first positioning element 122 and the second positioning element 124 are displaced inside and along the first positioning slot 517 and the second positioning slot 518, respectively. Though the first positioning element 122 and the second positioning element 124 don't move in a parallel manner, yet the first positioning element 122 and the second positioning element 124 can still move to keep the same distancing to the measuring center axis A. In addition, in an embodiment not shown herein, the first positioning element 122 and the second positioning element 124 can be moved manually, and fixed by magnetic forcing or hole-and-latch pairs. As such, the distance from either of these two positioning elements 122, 124 to the measuring center axis A can be equal to the radius of the inscribed circle of the workpiece.

Figure 8:
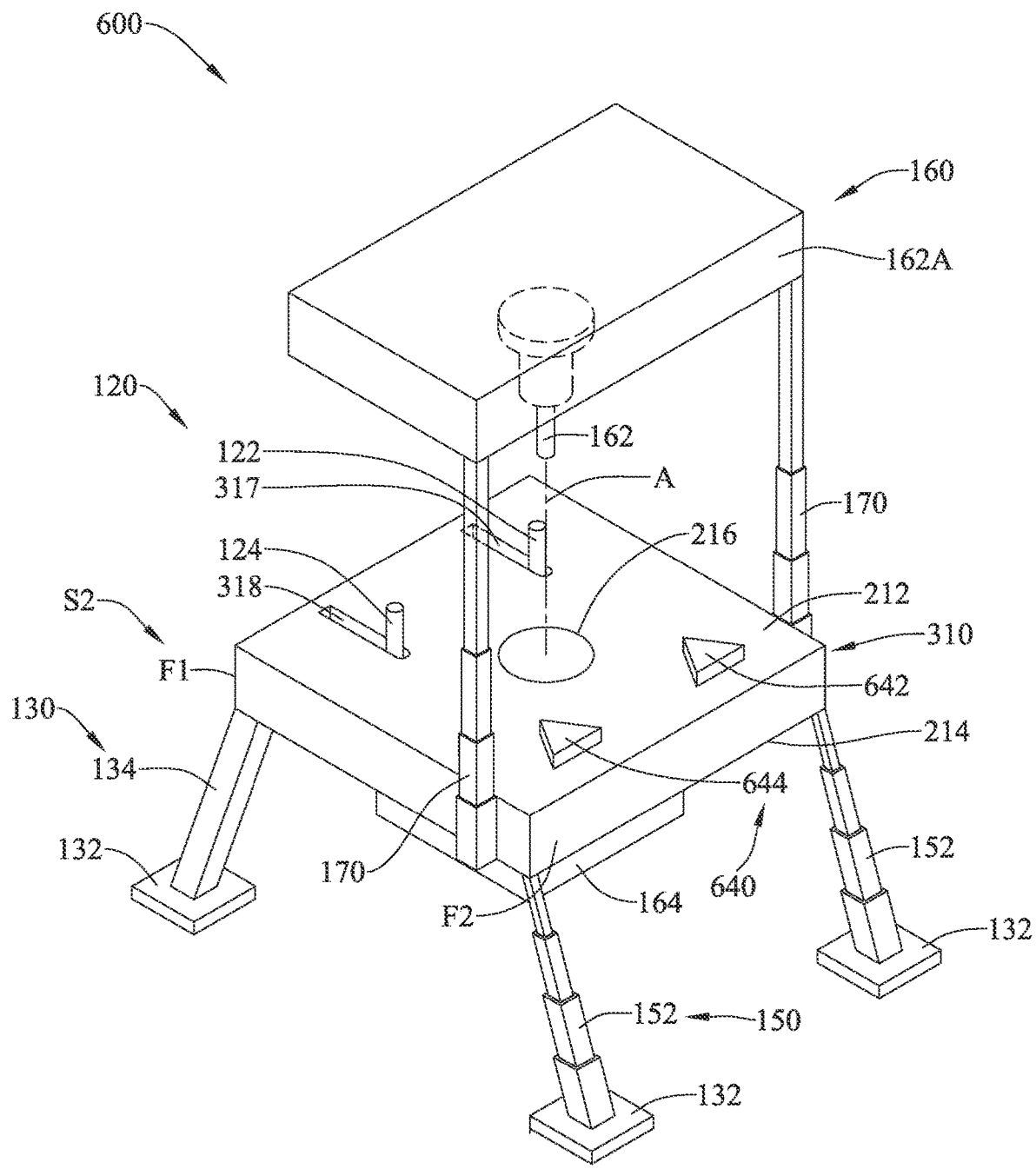
FIG. 8 is a schematic perspective view of one more embodiment of the measuring equipment in accordance with this disclosure.
Figure 9:
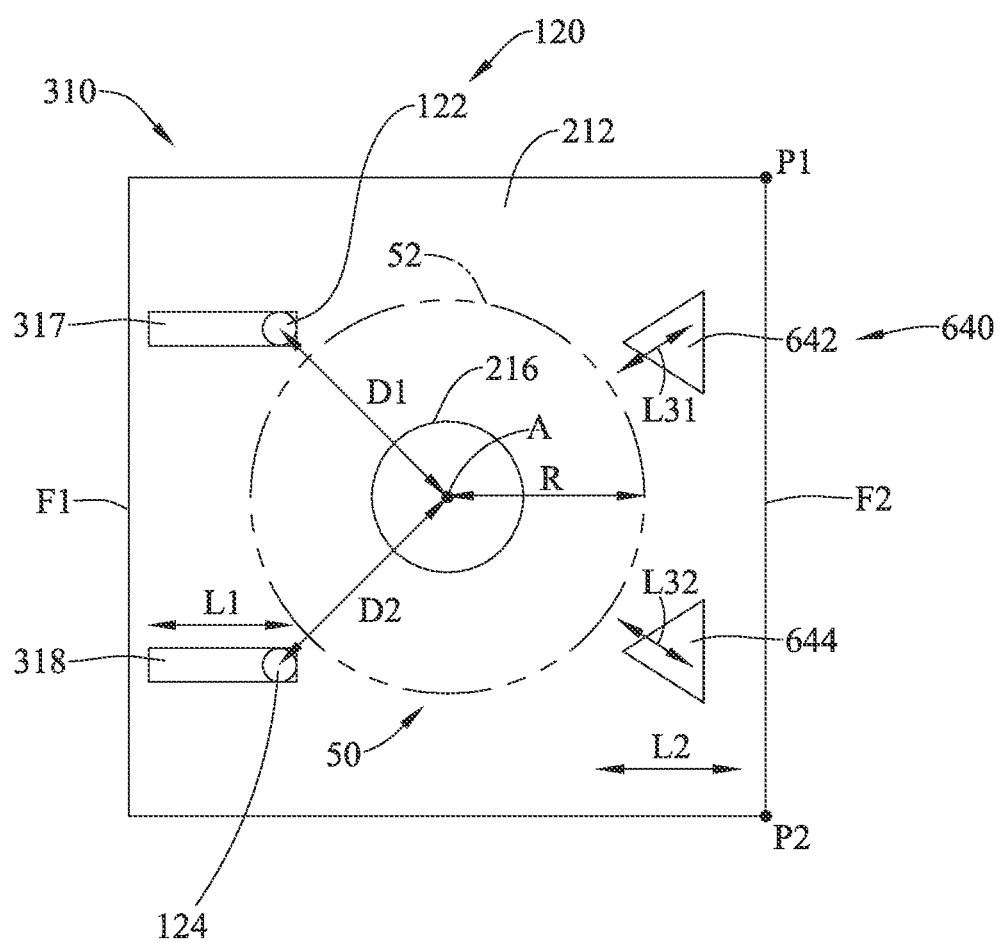
FIG. 9 is a schematic top view of an exemplary example of the main base and the positioning device of FIG. 8.

FIG. 8 is a schematic perspective view of one more embodiment of the measuring equipment in accordance with this disclosure, and FIG. 9 is a schematic top view of an exemplary example of the main base and the positioning device of FIG. 8. Referring to FIG. 8 and FIG. 9, by comparing to the main base 110 of FIG. 1, the main base 210 of FIG. 2 and FIG. 3, the main base 310 of FIG. 4, FIG. 5A and FIG. 5B, the main base 410 of FIG. 6, and the main base 510 of FIG. 7A and FIG. 7B, all of whom are furnished with the first positioning element 122 and the second positioning element 124 to position the workpiece 50, in this embodiment, the measuring equipment 600 further includes an auxiliary device 640 having a first auxiliary element 642 and a second auxiliary element 644. As shown in FIG. 8, the first auxiliary element 642 and the second auxiliary element 644 can be movably or rationally disposed on the top surface 212 of the main base 310, the auxiliary device 640 (such as the first auxiliary element 642 and the second auxiliary element 644) and the positioning device 120 (such as the first positioning element 122 and the second positioning element 124) are disposed on opposite sides of the measuring center axis A on the main base 310, or to opposite sides of the through hole 316 of the main base 310. In this embodiment, the main base 310 includes oppositely a first end F1 and a second end F2, the first auxiliary element 642 and the second auxiliary element 644 are disposed close to the second end F2 of the main base 310, and the first positioning element 122 and the second positioning element 124 are disposed close to the first end F1 of the main base 310.

Under such an arrangement, according to the radius R of the workpiece 50, when the first positioning element 122 and the second positioning element 124 have been adjusted on the main base 310 by displacing individually the first positioning element 122 and the second positioning element 124 along the first direction L1, and the first distance D1 from the first positioning element 122 to the measuring center axis A is equal to the second distance D2 from the second positioning element 124 to the measuring center axis A. It shall be explained that this first direction L1 can be identical to the first direction L1 shown in FIG. 1 to FIG. 6, or FIG. 8 to FIG. 9. The first positioning element 122 and the second positioning element 124 are moved in a parallel manner; i.e., along the same moving direction. However, in some other embodiments, as shown in FIG. 7A and FIG. 7B, the first positioning element 122 and the second positioning element 124 can be moved in a non-parallel manner; i.e., moved along different moving directions. Even that the first positioning element 122 and the second positioning element 124 do not move in the same direction, both the first positioning element 122 and the second positioning element 124 can be still moved individually toward the measuring center axis A.

Then, by utilizing a mechanical arm (not shown herein), a conveying belt (not shown herein) or any human or other means, the workpiece 50 can be located onto the main base 310, and the first positioning element 122 and the second positioning element 124 are directly applied to contact against the peripheral surface 52 of the workpiece 50. In some other embodiments, as shown in FIG. 9, when the workpiece 50 is placed on the top surface 212 of the main base 310, if the peripheral surface 52 of the workpiece 50 is yet to contact against the first positioning element 122 and the second positioning element 124, then the first auxiliary element 642 and the second auxiliary element 644 of this embodiment can be driven by an actuator (such as a motor, but not shown herein) to displace or rotate in the second direction L2 so as to contact the workpiece 50; i.e., to have the workpiece 50 to approach the first positioning element 122 and the second positioning element 124 till the workpiece 50 contacts both the first positioning element 122 and the second positioning element 124. Thus, in this disclosure, the first auxiliary element 642 and the second auxiliary element 644 can push the workpiece 50 so as to have the peripheral surface 52 to contact against the first positioning element 122 and the second positioning element 124, such that the workpiece 50 can be positioned to the measuring center axis A. It shall be explained that, in this embodiment, the second direction L2 is a direction toward the first positioning element 122 and the second positioning element 124, and the first auxiliary element 642 and the second auxiliary element 644 are moved in the same moving direction. Yet, in some other embodiments in accordance with this disclosure, the first auxiliary element 642 and the second auxiliary element 644 can be designed to approach the measuring center axis A in an individual manner. Namely, the first auxiliary element 642 moves toward the measuring center axis A in the third direction L31, but the second auxiliary element 644 moves toward the measuring center axis A in the fourth direction L32. Though the first auxiliary element 642 and the second auxiliary element 644 follow different moving directions, yet the workpiece 50 can be still contacted finally. In the aforesaid descriptions, the aforesaid first auxiliary element 642 and the aforesaid second auxiliary element 644 are moved individually in the third direction L31 and the fourth direction L32, respectively, to approach the same measuring center axis A. Similarly, the first auxiliary element 642 and the second auxiliary element 644 can follow the corresponding third and fourth directions L31, L32 to move away from the measuring center axis A, such that the first auxiliary element 642 and the second auxiliary element 644 can move closer to the corner positions P1, P2 at the second end F2 of the main base 310, respectively. At this time, the distance between the first auxiliary element 642 and the second auxiliary element 644 would become larger and easier for another workpiece 50 to be placed on the main base 310 from the second end F2 thereof.

Except for utilizing the aforesaid auxiliary device 640 to push and position the workpiece 50, in one embodiment, the top surface 212 of the main base 310 can be provided to be a plane with a low friction coefficient, such that the friction between the workpiece 50 and the top surface 212 can be substantially reduced. Namely, this surface finish of the top surface 212 plays a role of auxiliary sliding structure for easing the movement of the workpiece 50 on the main base 310. Practically, a plane with a lower friction coefficient can be achieved by adding a lubricant, a slip tape or the like film structure, or by introducing slipping balls, air-float nozzles or the like structure.

In one embodiment, the measuring equipment 600 further includes a support device 130 for supporting the main base 310. The support device 130 includes a plurality of foot plates 132 and a plurality of support legs 134. Each of the support legs 134 is connected between the main base 310 and the corresponding foot plate 132, so as to stand the main base 310 over the ground, and also to provide functions related to earthquake safety and level adjustment. Similarly, in this disclosure, the support device 130 (shown in FIG. 2 to FIG. 4) can be provided to the measuring equipment 100, 200, 300 shown in FIG. 1 to FIG. 4. In this embodiment, the support legs 134 and the foot plates 132 shown in the drawings are simply one of many exemplary examples for a demonstrative purpose, not for limiting the scope of this disclosure.

Figure 10:
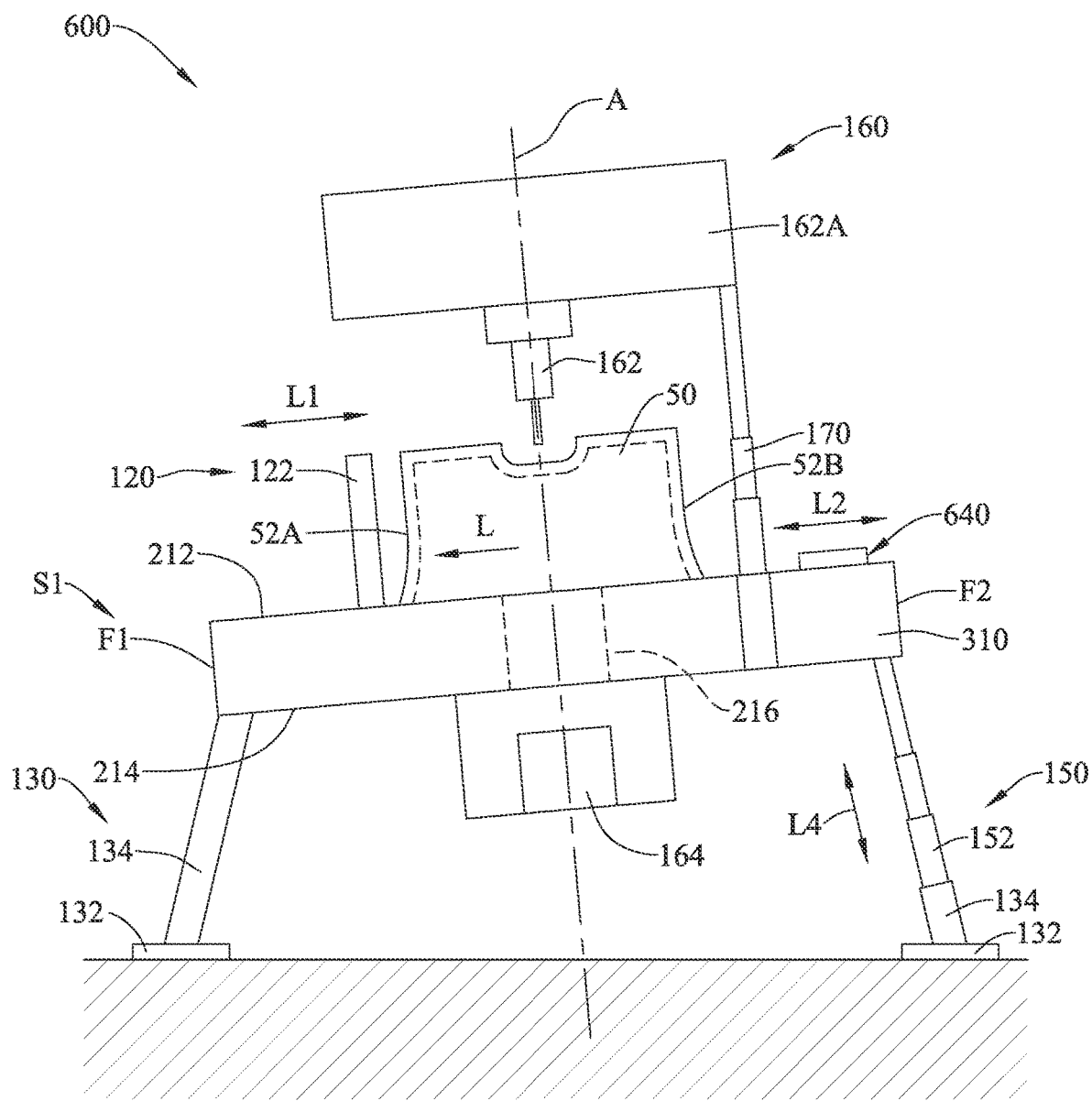
FIG. 10 demonstrates schematically a tilt state of FIG. 8.

FIG. 10 demonstrates schematically measuring equipment in a tilt state. Referring to FIG. 8 and FIG. 10, the measuring equipment 600 can further includes a tilting device 150 connected with the main base 310 and used for moving the main base 310 to switch around between a first state S1 and a second state S2. As shown in FIG. 10, while the main base 310 is in the first state S1, the level height of the first end F1 of the main base 310 is lower than that of the second end F2 thereof. While the main base 310 is in the second state S2, the level height of the first end F1 of the main base 310 is not lower than that of the second end F2 thereof (namely, as shown in FIG. 8, the level height of the first end F1 of the main base 310 is equal to that of the second end F2 thereof, such that the main base 310 is in a horizontal state), or the level height of the first end F1 of the main base 310 is higher than that of the second end F2 thereof. In detail, since the tilting device 150 is located close to the second end F2 of the main base 310, as the tilting device 150 pushes the bottom surface 214 of the main base 310 in a pushing direction L4 to tilt the main base 310, then the level height of the first end F1 of the main base 310 would be lower than that of the second end F2 thereof. Besides, for the measuring module 160 is fixed to the main base 310, thus, while the main base 310 is tilted, the measuring module 160 would be tilted as well, such that the related position of the measuring center axis A with respect to the main base 310 would keep the same, and so the parameters for the first sensing element 162 and the second sensing element 164 of the measuring module 160 do not need to be re-calibrated.

It shall be explained that, for example, the tilting device 150 can include a hydraulic rod 152 disposed between the main base 310 and the support leg 134 connecting the foot plate 132. The hydraulic rod 152 can be driven by an actuator (not shown in the figure) to perform extending and retrieving for varying the tilt angle of the main base 310; i.e., to switch around the first state S1 and the second state S2. Similarly, this disclosure does not place any limitation for the type of the tilting device 150, and actually any mechanism that can push and tilt the main base 310 is a qualified candidate for the tilting device 150 of this disclosure.

Under such an arrangement, as shown in FIG. 10, after the positions of the first positioning element 122 and the second positioning element 124 on the main base 310 have been adjusted according to the dimensions of the workpiece 50, then the distance from either of the first positioning element 122 and the second positioning element 124 to the measuring center axis A would be equal to the radius of the inscribed circle of the workpiece 50. At this time, the workpiece 50 is moved to be positioned on the top surface 212 of the main base 210. If the front peripheral surface 52A of the workpiece 50 has not yet contacted the first positioning element 122 and/or the second positioning element 124, then the first auxiliary element 642 and the second auxiliary element 644 can be applied to push the workpiece 50, so as to have the front peripheral surface 52A of the workpiece 50 to contact both of the first positioning element 122 and the second positioning element 124. In some other embodiments, this disclosure can further tilt the main base 310 to make the workpiece 50 move in the moving direction L and further contact the first positioning element 122 and the second positioning element 124. As such, the workpiece 50 can be also positioned to the measuring center axis A. It shall be explained that the moving direction L herein is directed to the direction from the second end F2 of the main base 310 to the first end F1 thereof.

Besides, the hydraulic rod 152 of the tilting device 150 can protrude upward so as to tilt the main base 310, thus the first sensing element 162 and the second sensing element 164 of the measuring module 160, and also the workpiece 50 are tilted to the left side of FIG. 10, and so the level height of the first end F1 of the main base 310 would be lower than that of the second end F2 thereof. At this time, cutting fluid and chips on the workpiece 50 would slip down by gravity along the tilted main base 310 and finally leave the main base 310. Thereupon, no excessive pollutants can leave on the main base 310 to affect the measurement, and the entire measuring area can be kept clean. In addition, even in the tilt state, since the relative position relationship between the workpiece 50 and the measuring module 160 including the first sensing element 162 and the second sensing element 164 is not changed, the measurement process can keep running. Further, the second sensing element 164 under the main base 310 can still perform measuring upon the workpiece 50 through the through hole 316 of the main base 310, since the second sensing element 164 as well as the main base 310 can be synchronously tilted by the same slope (such as 20 degrees). Thus, by relevantly arranging the distance between the sensing element 164 and the main base 310 or the bottom surface 214, and the angle formed by the main base 310 and the ground, excessive cutting fluid and chips can be dropped vertically down through the through hole 316 without hitting the second sensing element 164.

It shall be explained that, in this embodiment, the length of the support leg 134 at the first end F1 of the main base 310 can be less than that of another support leg 134 at the second end F2 thereof, such that the level height of the first end F1 is lower than that of the second end F2. While in the tilt state, since the measuring center axis A and the first sensing element 162 and the second sensing element 164 are aligned in an early stage, thus the measuring can still work in the tilt state. In addition, in anther embodiment of this disclosure, while the main base 310 is in the tilt state, the workpiece 50 can slide along the main base 310 by its own gravity to reach both the first positioning element 122 and the second positioning element 124.

In addition, the first state S1 and the second state S2 of the main base 310 are elucidated, but not limited to, by FIG. 10 and FIG. 8, respectively. For example, the second state S2 is shown to the main base 210 of FIG. 2 and FIG. 3, and to the main base 310 of FIG. 4. Or, in another embodiment, the main base 110 of FIG. 1 is seen as a top view for either the first state S1 or the second state S2. Or, the main base 110 of FIG. 1 can be used to replace the main base 310 of FIG. 8 or FIG. 10. Similarly, the main base 310 of FIG. 5A and FIG. 5B, the main base 410 of FIG. 6, and the main base 510 of FIG. 7A and FIG. 7B can be replaced by the main base 310 of FIG. 8 and FIG. 10 for demonstrating the first state S1, second state S2, respectively.

Figure 11:
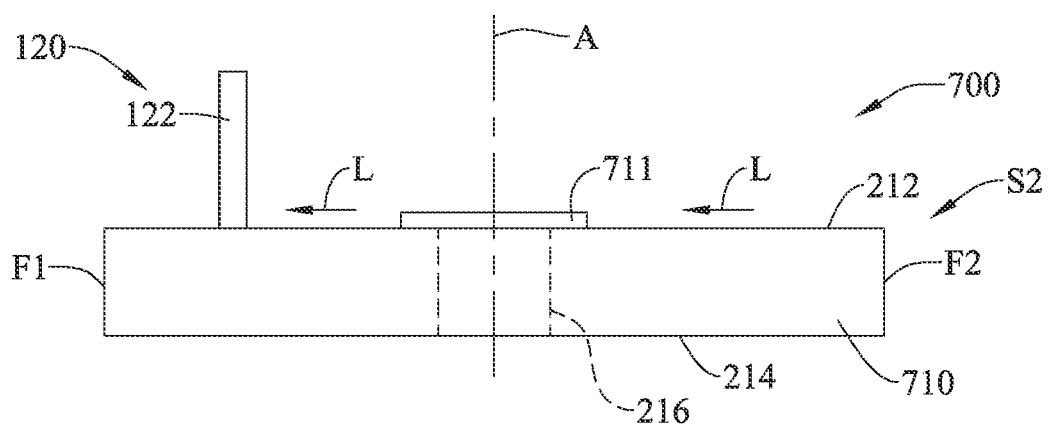
FIG. 11 demonstrates schematically another exemplary example of the main base of FIG. 8.

FIG. 11 demonstrates schematically another exemplary example of the main base of FIG. 8. Referring to FIG. 11, in order to explain concisely, only the main base 710 and the positioning device 120, similar to FIG. 8 and FIG. 10, are included in FIG. 11. The differences between the embodiment of FIG. 11 and that of FIG. 8 or FIG. 10 include at least that, in this embodiment, the main base 710 of the measuring equipment 700 further includes a surrounding side wall 711 protrusive around the through hole 216 on the top surface 212 of the main base 710. In addition, the surrounding side wall 711 surrounds the measuring center axis A. Referring also to FIG. 10, after the workpiece 50 is placed on the main base 710, the tilting device 150 would tilt the main base 710, the workpiece 50, the first sensing element 162 and the second sensing element 164 to the same direction, then the fluid on the main base 710 would move in the moving direction L. At this time, the surrounding side wall 711 would prevent the fluid from dropping into the through hole 216, and then to the space having the second sensing element 164, such that possible interference or contamination can be avoided.

Figure 12:
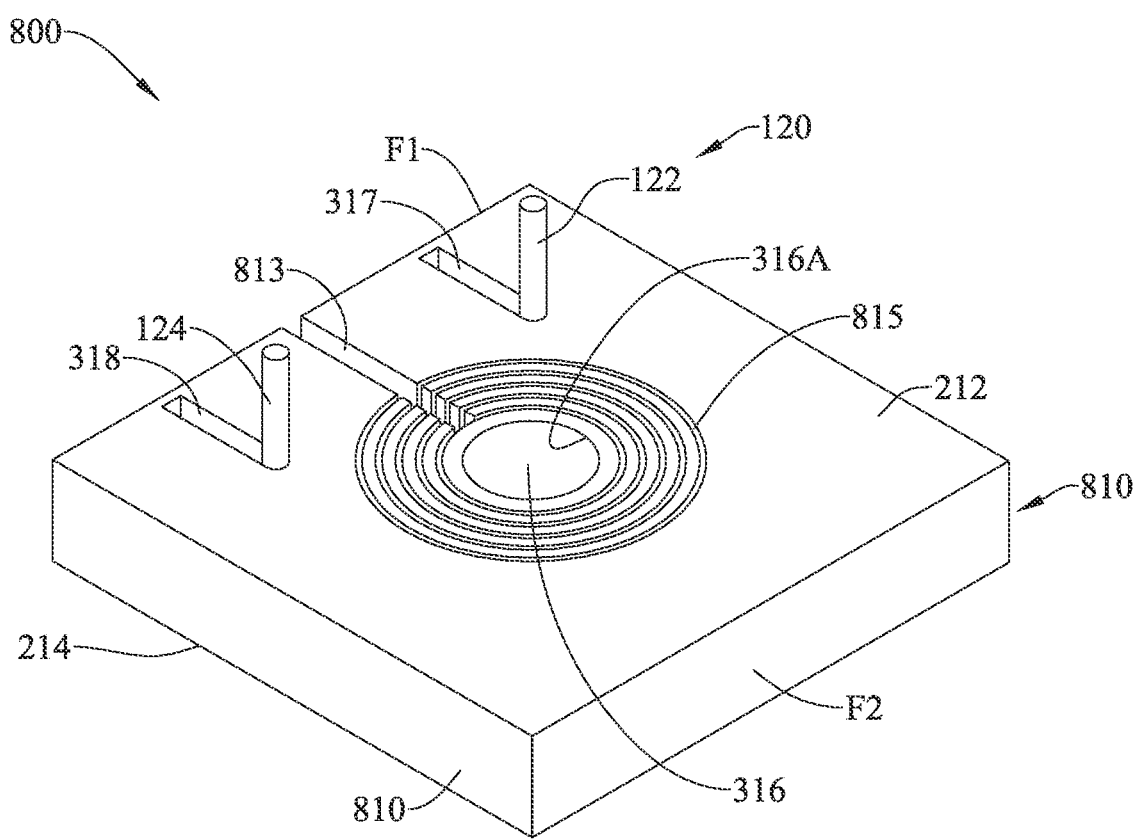
FIG. 12 demonstrates schematically a further exemplary example of the main base of FIG. 8.

Except for adopting the surrounding side wall 711 to avoid the fluid pollutants to contaminate the space where the measuring module 160 locates, please refer to FIG. 12, where a further exemplary example of the main base of measuring equipment as shown in FIG. 8 or FIG. 12 is demonstrated schematically. In order to explain concisely, only elements similar to the main base 310 and the positioning device 120 of measuring equipment as shown in FIG. 8 or FIG. 10 are schematically provided in FIG. 12. The differences between this embodiment of FIG. 12 and the previous embodiment of FIG. 8 or FIG. 10) include at least that, in this embodiment of FIG. 8 or FIG. 10, the through hole 316 of the measuring equipment 800 includes an upper opening 316A close to the top surface 212. The main base 810 further includes a first drainage channel 815 and a second drainage channel 813. The first drainage channel 815 and the second drainage channel 813 are structured deeply into the main base 810 from the top surface 212. The first drainage channel 815 is disposed to surround the upper opening 316A of the through hole 316, and to have the upper opening 316A of the through hole 316 as its surrounding center. In this embodiment, the first drainage channel 815 can be one or a plurality of concentric grooves surrounding the upper opening 316A for guiding the fluid on the main base 810 from the workpiece 50 to a specific region, such that the possibility of the fluid dropping into the through hole 316 can be significantly reduced. In addition, the second drainage channel 813 is formed as a straight groove deep to almost penetrate the main base 810 from the top surface 212 to barely reach the bottom surface 214 (i.e., the second drainage channel 813 does not penetrate through the bottom surface 214). The second drainage channel 813 is connected with the first drainage channel 815 by cutting geometrically straight into the winding thereof, and thus the fluid guided by the first drainage channel 815 can be collected into the second drainage channel 813 before being discharged out of the main base 810.

In summary, in the measuring equipment provided by this disclosure, each of the positioning elements can be adjusted according to the dimensions (such as the radius) of the workpiece, such that the distance from each of the positioning elements to the measuring center axis can be equal to the radius of the inscribed circle of the workpiece. Thereupon, when the workpiece is contacted against all the positioning elements, the measuring point of the workpiece can be aligned with the measuring center axis, such that the workpiece can resume its original position after the measurement. Thus, the measuring equipment according to this disclosure can be widely applied with enhanced measuring accuracy.

Further, this disclosure introduces a method of tilting the main base for sliding the workpiece along the main base by its own gravity to reach and contact every positioning elements, and to position the workpiece purposely with respect to the measuring center axis. In addition, with this tilting method, excessive cutting fluid and chips on the workpiece or main base can be driven to leave the main base, and so the main base can be kept away from the excessive pollutants. Hence, the pollutant factor on the measurement can be waived, and the entire measuring region can be kept clean. With the adverse effect upon the measuring of the measuring module being reduced to a minimum, and with the relative position relationship between the measuring module and workpiece being kept even under a tilt of the main base, the measuring accuracy of the measuring equipment of this disclosure can be thus substantially enhanced.

In addition, this disclosure further utilizes the auxiliary element to push the workpiece so as to ensure the workpiece to contact against each of the positioning elements, such that the workpiece can be purposely positioned to the measuring center axis.

Further, this disclosure further introduces the upstanding wall or the drainage channel to surround the through hole of the main base, such that the excessive cutting fluid and chips on the workpiece or the main base can be better guided to leave the main base.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A dimension measurement apparatus, applied to carry a workpiece to be measured, comprising:
   a main base, including a measuring center axis; and
   a positioning device, including at least two positioning elements, wherein each of the at least two positioning elements is movably disposed on the main base, and each of the at least two positioning elements is movable with respect to the measuring center axis such that distances from the at least two positioning elements to the measuring center axis are adjusted to be identical, wherein each of the at least two positioning elements is used for the workpiece to contact and to position the workpiece to the measuring center axis.

2. The dimension measurement apparatus of claim 1, wherein the main base comprises a top surface for carrying the workpiece and a bottom surface opposite to the top surface, each of the at least two positioning elements is protrusive over the top surf ace, and the measuring center axis penetrates through both the top surface and the bottom surface.

3. The dimension measurement apparatus of claim 2, wherein the main base further comprises a through hole penetrating through the main base from the top surface to the bottom surface, and the through hole and the measuring center axis are co-axial.

4. The dimension measurement apparatus of claim 3, wherein the through hole comprises an upper opening close to the top surface, the main base further comprises a drainage channel recessing from the top surf ace, and the drainage channel extends to surround the upper opening of the through hole.

5. The dimension measurement apparatus of claim 3, wherein the main base further comprises a surrounding side wall protrusive over the top surface, and the surrounding side wall surrounds the measuring center axis.

6. The dimension measurement apparatus of claim 2, wherein the main base further includes at least two positioning slots recessing from the top surface of the main base, each of the at least two positioning elements is disposed into each of the corresponding positioning slots, and each of the at least two positioning elements is to slide and to be positioned along the corresponding positioning slot.

7. The dimension measurement apparatus of claim 6, wherein the positioning device further includes a connecting bar connecting each of the at least two positioning elements.

8. The dimension measurement apparatus of claim 6, wherein the at least two positioning slots are extended in a parallel or non-parallel manner.

9. The dimension measurement apparatus of claim 6, wherein each of the at least two positioning slots includes oppositely a near end and a far end, and a distance from the near end to the measuring center axis is less than a distance from the far end to the measuring center axis.

10. The dimension measurement apparatus of claim 9, wherein a distance between the near ends of the at least two positioning slots is less than a distance between the far ends of the at least two positioning slots.

11. The dimension measurement apparatus of claim 1, further comprising at least two auxiliary elements movably disposed on the main base, each of the at least two auxiliary elements is movable with respect to each of the positioning elements so as to push the workpiece to approach the positioning elements.

12. The dimension measurement apparatus of claim 1, wherein the main base includes oppositely a first end and a second end, each of the at least two positioning elements is disposed near the first end, and a level height of the first end is substantially equal to a level height of the second end.

13. The dimension measurement apparatus of claim 1, wherein the main base includes oppositely a first end and a second end, each of the at least two positioning elements is disposed near the first end, and a level height of the first end is lower than a level height of the second end.

14. The dimension measurement apparatus of claim 1, further comprising a tilting device connected with the main base and used for tilting the main base and switching the main base between a first state and a second state, wherein the main base includes oppositely a first end and a second end, wherein, when the main base is in the first state, a level height of the first end of the main base is lower than a level height of the second end; and when the main base is in the second state, the level height of the first end of the main base is not lower than the level height of the second end.

15. The dimension measurement apparatus of claim 1, further comprising a support device for supporting the main base, wherein the support device includes a plurality of foot plates and a plurality of table legs, and each of the table legs is connected between the main base and the foot plate.

16. The dimension measurement apparatus of claim 1, further comprising a measuring module assembled with the main base for measuring the workpiece.

17. A dimension measurement apparatus, applied to carry a workpiece to be measured, comprising:
   a main base, including a measuring center axis; and
   a positioning device, including at least two positioning elements, wherein each of the at least two positioning elements is movably disposed on the main base, and each of the at least two positioning elements is movable with respect to the measuring center axis such that distances from the at least two positioning elements to the measuring center axis are adjusted to be identical, wherein each of the at least two positioning elements is used for the workpiece to contact and to position the workpiece to the measuring center axis;
   wherein each of the at least two positioning elements is protrusive over a top surface of the main base, and the measuring center axis penetrates through both the top surface and a bottom surface of the main base.

18. A dimension measurement apparatus, applied to carry a workpiece to be measured, comprising:
- a main base, including a measuring center axis, the main base including a first end and an opposite second end, where a level height of the first end is lower than a level height of the second end; and
- a positioning device, including at least two positioning elements, wherein each of the at least two positioning elements is movably disposed on the main base, and
- each of the at least two positioning elements is movable with respect to the measuring center axis such that distances from the at least two positioning elements to the measuring center axis are adjusted to be identical, wherein each of the at least two positioning elements is used for the workpiece to position the workpiece to the measuring center axis;
- wherein the main base includes a first end and a second end, each of the at least two positioning elements is disposed near the first end, and a level height of the first end is lower than a level height of the second end.

* * * * *